United States Patent
Mihara (10) Patent No.: US 11,453,294 B2
(45) Date of Patent: Sep. 27, 2022

(54) CONTROL DEVICE OF MOTOR DRIVEN VEHICLE, CONTROL METHOD OF MOTOR DRIVEN VEHICLE AND NON-TRANSITORY COMPUTER READABLE STORAGE MEDIUM STORING CONTROL PROGRAM OF MOTOR DRIVEN VEHICLE

(71) Applicant: Marelli Corporation, Saitama (JP)

(72) Inventor: Teruyoshi Mihara, Saitama (JP)

(73) Assignee: Marelli Corporation, Saitama (JP)

( * ) Notice: Subject to any disclaimer, the term of this patent is extended or adjusted under 35 U.S.C. 154(b) by 373 days.

(21) Appl. No.: 16/826,947

(22) Filed: Mar. 23, 2020

(65) Prior Publication Data
US 2020/0307389 A1  Oct. 1, 2020

(30) Foreign Application Priority Data

Mar. 25, 2019 (JP) .............................. JP2019-056625
Sep. 19, 2019 (JP) .............................. JP2019-170586

(51) Int. Cl.
| | |
|---|---|
| *H02P 27/04* | (2016.01) |
| *B60L 15/20* | (2006.01) |
| *B60L 53/20* | (2019.01) |
| *B60L 50/60* | (2019.01) |
| *B60L 15/04* | (2006.01) |
| *B60L 15/08* | (2006.01) |
| *H02M 7/5387* | (2007.01) |
| *H02P 27/06* | (2006.01) |

(52) U.S. Cl.
CPC .............. *B60L 15/20* (2013.01); *B60L 15/04* (2013.01); *B60L 15/08* (2013.01); *B60L 50/66* (2019.02); *B60L 53/20* (2019.02); *H02M 7/53871* (2013.01); *H02P 27/06* (2013.01); *B60L 2240/54* (2013.01)

(58) Field of Classification Search
CPC .......... B60L 15/20; B60L 53/20; B60L 50/66; B60L 15/04; B60L 15/08; B60L 2240/54; H02M 7/53871; H02P 27/06; G05B 13/00; G05B 13/02
See application file for complete search history.

(56) References Cited

U.S. PATENT DOCUMENTS 6,647,939 B2  11/2003  Manabe et al.

FOREIGN PATENT DOCUMENTS

| CN | 108520987 B | * 4/2020 | .......... H01M 10/613 |
|---|---|---|---|
| CN | 113635787 A | * 11/2021 | |
| JP | 2002-195138 A | 7/2002 | |

(Continued)

*Primary Examiner* — Karen Masih
(74) *Attorney, Agent, or Firm* — Young Basile Hanlon & MacFarlane, P.C.

(57) ABSTRACT

A motor is stably driven under an extremely low temperature. A control unit controls an inverter to extract a pulse-like direct current from a battery, in case where a temperature Temp of the battery is below a predetermined value TH at which a power that can drive a motor is continuously extractable, by cyclically repeating an on-period to extract the direct current that can drive the motor from the battery and an off-period in which, after the on-period, the power is not extracted from the battery until the direct current that can drive the motor becomes extractable from the battery again. The inverter converts, to a phase current, the direct current extracted from the battery in the on-period.

10 Claims, 6 Drawing Sheets

(56) References Cited

FOREIGN PATENT DOCUMENTS

| JP | 2010-093883 A | 4/2010 |
| JP | 2015-037013 A | 2/2015 |
| JP | 2016-002833 A | 1/2016 |

\* cited by examiner

CONTROL DEVICE OF MOTOR DRIVEN VEHICLE, CONTROL METHOD OF MOTOR DRIVEN VEHICLE AND NON-TRANSITORY COMPUTER READABLE STORAGE MEDIUM STORING CONTROL PROGRAM OF MOTOR DRIVEN VEHICLE

CROSS-REFERENCE TO RELATED APPLICATIONS

This application claims priority to Japanese Application Patent Serial No. JP 2019-056625 filed Mar. 25, 2019 and Japanese Application Patent Serial No. JP 2019-170586 filed Sep. 19, 2019, the entire disclosures of which are hereby incorporated by reference.

TECHNICAL FIELD

The present invention relates to a control device of a motor driven vehicle, a control method of the motor driven vehicle and a non-transitory computer readable storage medium storing a control program of the motor driven vehicle.

BACKGROUND

In an electric vehicle or a hybrid vehicle, an inverter extracts a direct current from a battery to generate a phase current, and a motor is rotationally driven so that the vehicle travels.

Under low temperature environment, an internal resistance of the battery increases, and extractable power from the battery decreases. Patent Literature 1 (Japanese Patent Laid-Open No. 2016-2833) discloses control that is performed by detecting a temperature of a battery, and repeatedly charging and discharging the battery at low temperatures, to warm up the battery.

SUMMARY

Under an extremely low temperature of e.g. minus 30° C., however, ions in a battery are hard to move, and it may be difficult to continuously extract, from the battery, a current sufficient to drive a motor. In this situation, particularly in an electric vehicle in which the battery is only a drive source, it is difficult to stably rotate and drive the motor so that the vehicle travels. In Patent Literature 1, disclosed is a technology based on a hybrid vehicle in which the battery and an engine are used together as drive sources, and it is not suggested that the motor is continuously rotated and driven by the battery under the extremely low temperature.

An object of the present invention is to provide a technology that stably drives a motor even in a situation where it is difficult to continuously extract a motor drivable power from a battery under an extremely low temperature or the like.

To achieve the above object, a control device of a motor driven vehicle according to the present invention comprises:

an inverter that extracts a direct current from a battery of a vehicle configured to travel by rotational driving of a motor, generates a phase current, and drives the motor, a vehicle control module that generates a torque command signal to drive the motor in accordance with a driver's operation, and a control unit that controls an extraction of the direct current from the battery by the inverter, based on a temperature of the battery, wherein the vehicle control module sends the torque command signal to the control unit, the control unit controls the inverter to extract a pulse-like direct current from the battery, in case where the temperature of the battery is below a predetermined temperature at which a motor drivable power is continuously extractable, the control unit controls the inverter in the extraction of the pulse-like direct current to cyclically repeat an on-period to extract the motor drivable direct current from the battery and an off-period in which, after the on-period, the power is not extracted from the battery until the motor drivable direct current becomes extractable from the battery again, and the control unit calculates a maximum torque that the motor is capable of outputting in case where the pulse-like direct current is extracted from the battery, compares the maximum torque with the torque command signal, sets a smaller one of the maximum torque and the torque command signal as a torque target value to drive the motor, and controls the extraction of the pulse-like direct current by the inverter to drive the motor at the torque target value, and the inverter converts, to the phase current, the direct current extracted from the battery in the on-period.

To achieve the above object, a control method of a motor driven vehicle according to the present invention comprises:

a step of generating a torque command signal to drive a motor in accordance with a driver's operation of the vehicle configured to travel by rotational driving of the motor, a step of detecting a temperature of a battery the vehicle, and a step of controlling an inverter to extract a pulse-like direct current from the battery, in case where the temperature of the battery is below a predetermined temperature at which a motor drivable power is continuously extractable, the step of controlling the inverter to extract the pulse-like direct current from the battery includes: controlling the inverter to cyclically repeat an on-period to extract the motor drivable direct current from the battery and an off-period in which, after the on-period, the power is not extracted from the battery until the motor drivable direct current becomes extractable from the battery again, calculating a maximum torque that the motor is capable of outputting in case where the pulse-like direct current is extracted from the battery, comparing the maximum torque with the torque command signal, setting a smaller one of the maximum torque and the torque command signal as a torque target value to drive the motor, and controlling an extraction of the pulse-like direct current by the inverter to drive the motor at the torque target value, and the method further comprises a step of, by the inverter, converting, to a phase current, the direct current extracted from the battery in the on-period, and driving the motor.

To achieve the above object, a non-transitory computer readable storage medium storing a control program of a motor driven vehicle according to the present invention causes a computer to execute:

a step of generating a torque command signal to drive a motor in accordance with a driver's operation of the vehicle configured to travel by rotational driving of the motor, a step of detecting a temperature of a battery of the vehicle, and a step of controlling an inverter to extract a pulse-like direct current from the battery, in case where the temperature of the battery is below a predetermined temperature at which a motor drivable power is continuously extractable, the step of controlling the inverter to extract the pulse-like direct current from the battery including: controlling the inverter to cyclically repeat the on-period to extract the motor drivable direct current from the battery and an off-period in which, after the on-period, the power is not extracted from the battery until the motor drivable direct current becomes extractable from the battery again, calculating a maximum torque that the motor is capable of outputting in case where the pulse-like direct current is extracted from the battery, comparing the maximum torque with the torque command signal, setting a smaller one of the maximum torque and the torque command signal as a torque target value to drive the motor, and controlling the extraction of the pulse-like direct current by the inverter is controlled to drive the motor at the torque target value, and the present invention further causes the computer to execute a step of, by the inverter, converting, to a phase current, the direct current extracted from the battery in the on-period, and driving the motor.

According to the present invention, in case where a temperature of a battery is low and a motor drivable power cannot be continuously extracted from the battery, a direct current (a pulse-like direct current) is cyclically extracted only in a period in which the battery can discharge the motor drivable power. Consequently, even in a situation where it is difficult to continuously extract the motor drivable power from the battery, for example, under an extremely low temperature, the motor can be stably driven, so that the present invention improves convenience.

DETAILED DESCRIPTION

Hereinafter, an embodiment of the present invention is described illustratively in detail with reference to the drawings. It is noted, however, components described in the following embodiment are merely examples, and are not intended to limit a technical scope of the present invention only to those components.

First Embodiment

Figure 1:
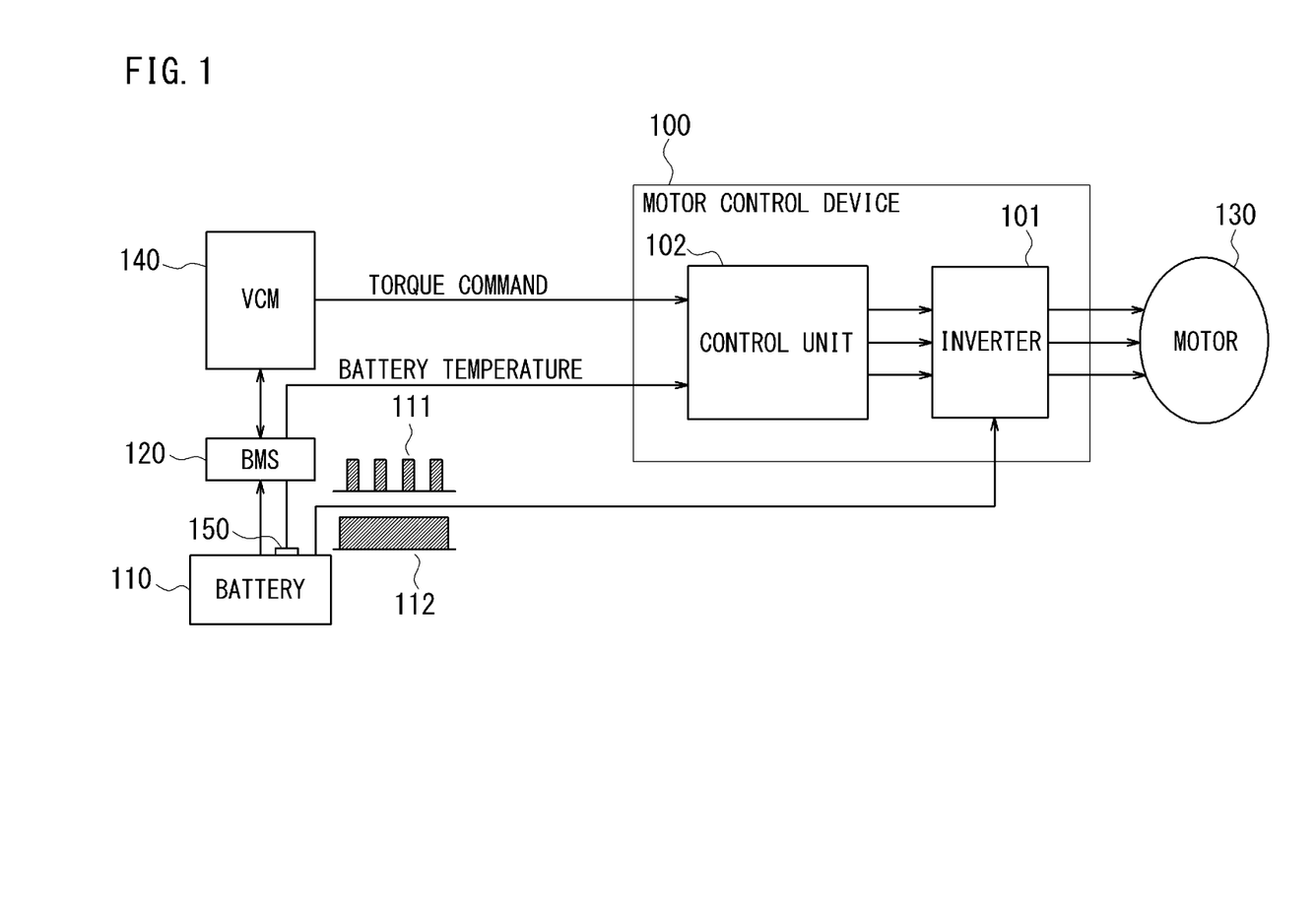
FIG. 1 is a block diagram showing a motor control device according to a first embodiment of the present invention and a peripheral configuration thereof.

A motor control device 100 as a first embodiment will be described with reference to FIG. 1. The motor control device 100 as the first embodiment includes an inverter 101 and a control unit 102, and is connected to a battery 110, a battery management system (BMS) 120, a motor 130 and a vehicle control module (VCM) 140.

The battery 110 can be, for example, a lithium ion battery in which a lithium ion moves between a positive electrode and a negative electrode to perform charge and discharge.

The inverter 101 extracts a direct current from the battery 110, generates a phase current, and supplies the current to the motor 130, to drive the motor 130. That is, the inverter 101 functions as a motor drive unit that drives the motor 130 using the direct current from the battery 110.

The control unit 102 controls the inverter 101 to extract a pulse-like direct current 111 from the battery 110 under predetermined conditions. Specifically, the control unit 102 controls the inverter 101 to extract the pulse-like direct current 111 from the battery 110, in case where a temperature of the battery 110 is below a predetermined value TH. On the other hand, the control unit 102 controls the inverter 101 to extract a non-pulse like direct current 112 from the battery 110, in case where the temperature of the battery 110 is more than or equal to the predetermined value TH. The predetermined value TH indicates a temperature at which a power that can drive the motor 130 can be continuously extracted from the battery 110, and is preset based on specifications of the motor 130 and an electric vehicle to be driven by the motor 130. The predetermined value TH is not limited to a specific value, and can be, for example, minus 10° C.

The control unit 102 sets a cycle of the pulse-like direct current 111, for example, between 10 ms and 50 ms inclusive. Furthermore, the control unit 102 may change the cycle of the pulse-like direct current 111 in accordance with a temperature of the battery 110. If the temperature of the battery 110 rises, the control unit 102 may increase a duty ratio of the pulse-like direct current 111 to lengthen an on-period and shorten an off-period.

States (a battery output voltage and a battery temperature Temp) of the battery 110 are monitored by the battery management system 120. The battery temperature Temp is detected by a sensor 150 provided in the battery 110, and sent to the control unit 102 via the battery management system 120. The control unit 102 compares this temperature Temp with the predetermined value TH, to determine whether to perform "a low-temperature motor drive mode". The inverter 101 converts the direct current of the battery 110 to a three-phase alternating current to output the current to the motor 130.

Figure 2:
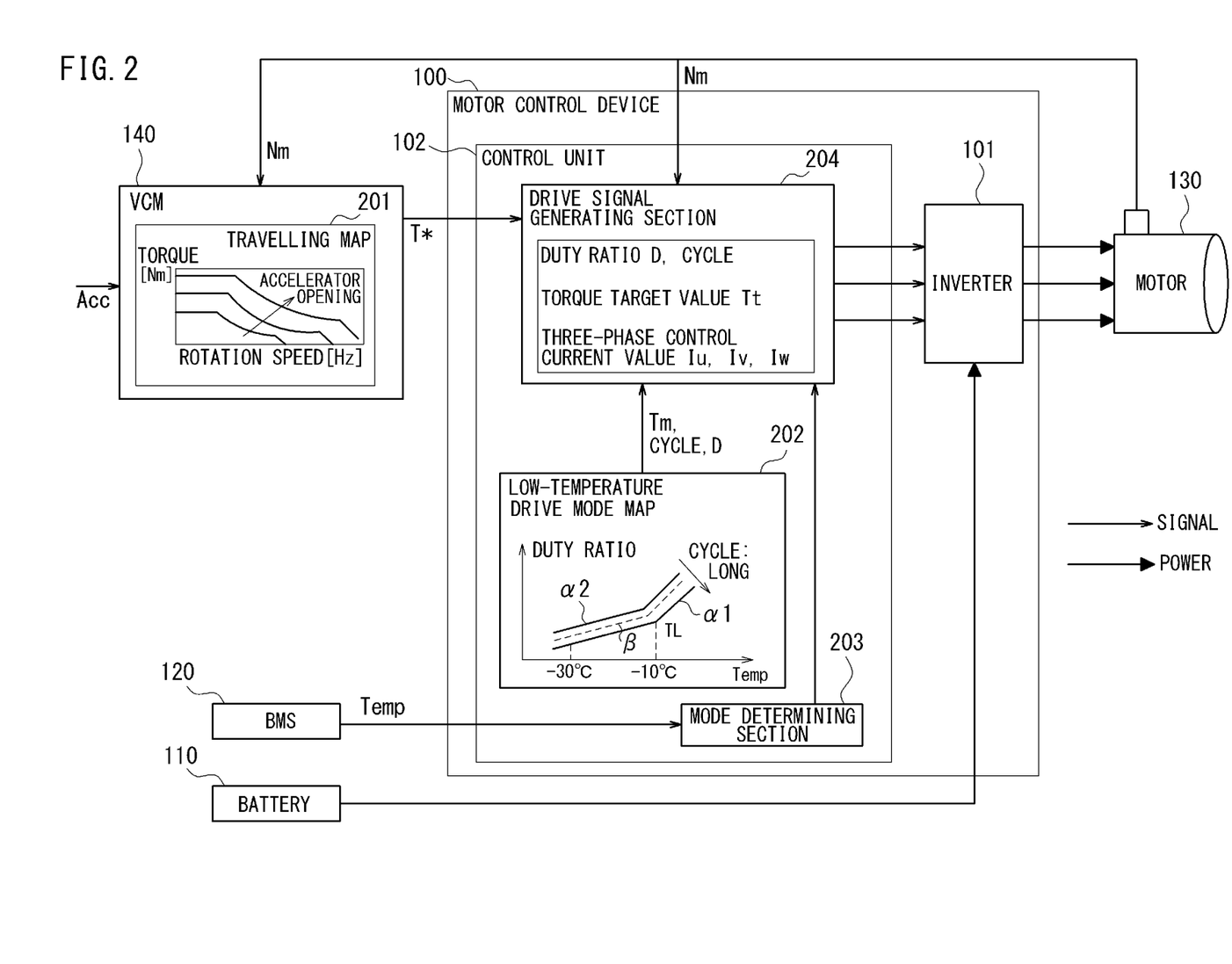
FIG. 2 is a block diagram showing an internal configuration of the motor control device according to the first embodiment of the present invention.

FIG. 2 is a diagram to explain an operation of the control unit 102 in detail. As to each of arrows coupling blocks to each other, the arrow having a larger arrowhead indicates a power path, and the arrow having a smaller arrowhead indicates a signal path. The control unit 102 comprises a mode determining section 203 and a drive signal generating section 204. The mode determining section 203 determines whether the drive mode of the motor 130 should be a normal mode or a low-temperature drive mode in accordance with the battery temperature Temp, and sends a determination result to the drive signal generating section 204.

In the normal mode, the vehicle control module 140 generates a torque command signal T*, with reference to a travelling map 201, based on an accelerator opening Acc by a driver's operation, and a motor speed Nm, and sends the signal to the control unit 102. The drive signal generating section 204 of the control unit 102 receives the determination result sent from the mode determining section 203 that indicates the normal mode, and decides the torque command signal T* as a torque target value Tt. The drive signal generating section 204 further uses the motor speed Nm to obtain a three-phase control current value, and controls the inverter 101. Note that in the normal mode, the inverter 101 continuously extracts the power to drive the motor 130 from the battery 110.

On the other hand, in the low-temperature drive mode, the control unit 102 decides a duty ratio D of the pulse-like direct current 111 that obtains a maximum outputtable torque in current driving conditions, and the control unit calculates a maximum torque Tm obtainable at this duty ratio. The duty ratio D is a ratio of a time in which the direct current flows in a cycle. The control unit 102 determines the duty ratio D and calculates the maximum torque Tm, with reference to a low-temperature drive mode map 202, based on the battery temperature Temp and the previously obtained cycle of the pulse-like direct current 111. The control unit 102 sends the determined duty ratio D and the calculated maximum torque Tm to the drive signal generating section 204.

The drive signal generating section 204 receives the determination result sent from the mode determining section 203 that indicates the low-temperature drive mode, and compares the torque command value T* obtained from the vehicle control module 140 with the maximum torque Tm obtained from the control unit 102. The drive signal generating section 204 determines a smaller one of the torque command value T* and the maximum torque Tm as the torque target value Tt to drive the motor.

The drive signal generating section 204 decides the three-phase control current value to extract the pulse-like direct current 111 having the obtained cycle and the duty ratio D so that the motor 130 is driven at the torque target value Tt.

In the pulse-like direct current 111, the three-phase control current value is set such that the current flows through the motor 130 only for a period to extract the direct current from the battery 110 (the on-period), and the three-phase control current value is set zero in a period in which the direct current is not extracted from the battery 110 (the off-period). The inverter 101 is controlled based on this three-phase control current value.

Specifically, as shown in the low-temperature drive mode map 202 of FIG. 2, in case where the cycle of the pulse-like direct current 111 is set to an arbitrary value between a cycle α1 and a cycle α2 that are shown by solid lines (here α1>α2), one duty ratio D is determined at the battery temperature Temp. For example, in case where the cycle is set to β shown by a dotted line (α2<β<α1), a relation between the battery temperature Temp and the duty ratio D indicates a characteristic along the dotted line in the low-temperature drive mode map 202. If the cycle and the duty ratio D are determined, the maximum torque Tm of the motor 130 to be driven on the conditions is determined.

The control unit 102 of the motor control device 100, which receives the determination result from the mode determining section 203 as described above, sets a driving mode to excite the battery 110 to any one of driving mode of the normal mode and the low-temperature drive mode. In the low-temperature drive mode, even if the battery 110 is at the low temperature, the motor 130 can be stably rotated forward so that the electric vehicle can travel forward.

Here, the rotation of the motor 130 and an operation of the battery 110 will be described.

Figure 3A:
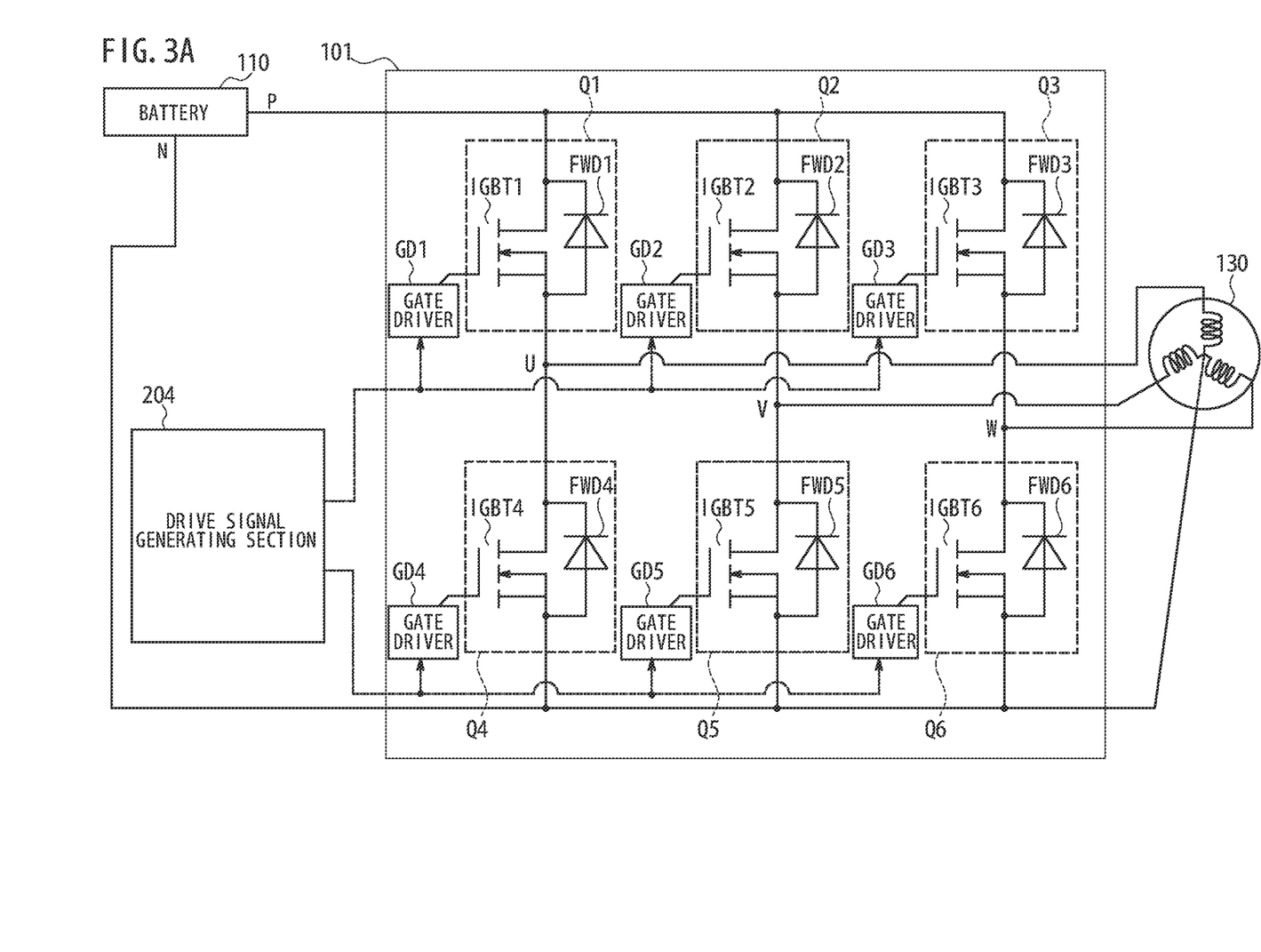
FIG. 3A is a block diagram showing internal configurations of an inverter and a motor according to the first embodiment of the present invention.

FIG. 3A is a diagram showing a configuration of the inverter 101. The inverter 101 includes power semiconductor switching elements Q1 to Q3 and Q4 to Q6 that are provided in commutation elements of respective phases U, V and W, respectively. In the present embodiment, the respective power semiconductor switching elements Q1 to Q6 are constituted of insulated gate bipolar transistors IGBT1 to IGBT6 and freewheeling diodes FWD1 to FWD6, respectively. The drive signal generating section 204 transmits an on-signal or an off-signal of a frequency (a carrier frequency) corresponding to the motor speed to each of gate drivers GD1 to GD6 of IGBT1 to IGBT6. The inverter 101 generates alternating currents of three phases UVW based on this on or off-signal (a pulse signal), and supplies the current to the motor 130.

In the motor 130, a U-phase coil is driven by the elements Q1 and Q4 of the inverter 101, a V-phase coil is driven by Q2 and Q5, and a W-phase coil is driven by Q3 and Q6.

Figure 3B:
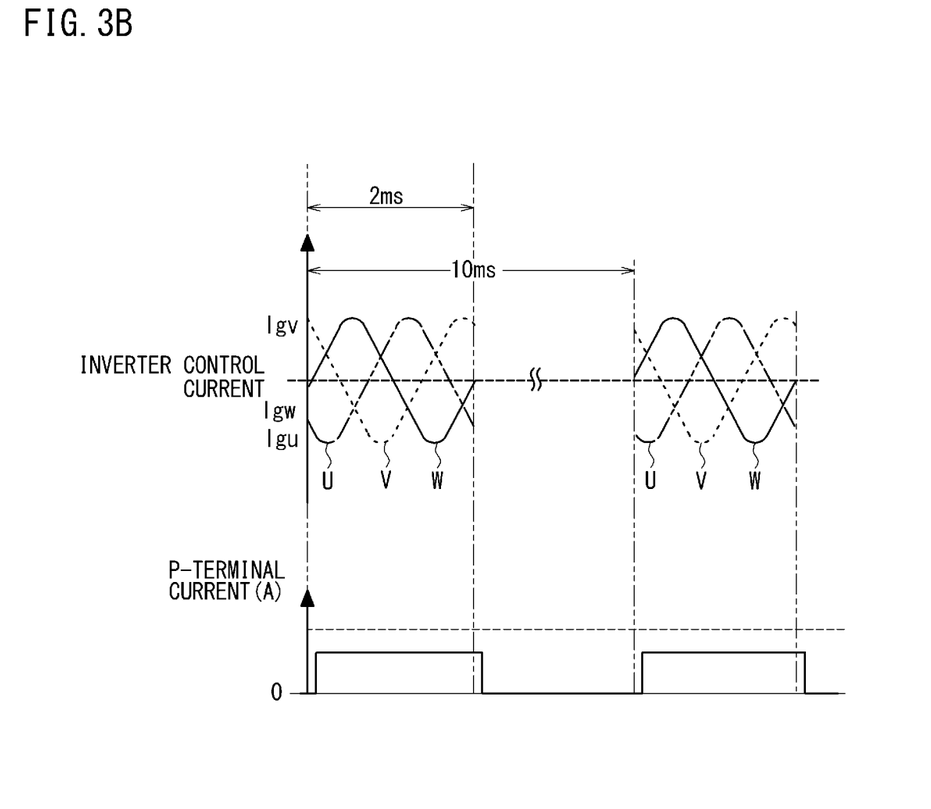
FIG. 3B is a diagram showing a control signal of the inverter according to the first embodiment of the present invention.

The elements Q1 and Q4 for the U-phase are driven by an inverter control voltage VgU. The elements Q2 and Q5 for the V-phase are driven by an inverter control voltage VgV. Similarly, the elements Q3 and Q6 for the W-phase are driven by an inverter control voltage VgW. On/off-control of three sets of IBGTs is performed so that three phase currents Iu, Iv and Iw all have the same current value and are alternating currents having a phase difference of 120 degrees. Furthermore, the three sets of IGBTs are connected to a P-pole busbar and an N-pole busbar of the battery 110. A total of the three-phase alternating currents forms a direct current, and hence the current observed at the P-pole is a positive direct current flowing in a direction from the P-pole to the N-pole as shown in FIG. 3B. That is, the three-phase alternating currents are generated from the current extracted from the battery 110, and a rotating magnetic field is generated, so that the motor 130 rotates in a positive direction, that is, a forward direction.

Here, at low temperatures, the lithium ion in the battery 110 is hard to move, and an internal resistance increases, thereby making it difficult to continuously extract a power that is large enough to drive the motor 130.

Even at the low temperatures, however, it is possible to temporarily extract the large power from the battery 110. The battery usually has a function of electrochemically generating the power and additionally comprises a component corresponding to a capacitor, and in a state where any currents do not flow, electric charge is stored in the capacitor component. That is, it can be considered that the large current can be temporarily generated by extracting the electric charge stored in the capacitor component, even in the state where the internal resistance of the battery 110 is large and the current is hard to flow at the low temperatures.

Therefore, in the low-temperature drive mode, the inverter 101 intermittently extracts, from the battery 110, the power having a level that can drive the motor 130 to start the rotation of the motor 130. Then, in the low-temperature drive mode, so-called "pulse-like direct current" extraction is performed by cyclically repeating extraction of the direct current that can drive the motor 130 and suspension of extraction stop to again store the electric charge in the capacitor component of the battery 110. Consequently, the rotation and drive of the motor 130 can be stably maintained also at the low temperatures.

Here, the power having the level that can drive the motor 130 may be, for example, a predetermined power that can generate a torque to start the electric vehicle comprising the drive motor 130 on level ground, and the battery temperature Temp at which the power is extractable may be preset as the predetermined value TH that is a switching threshold between the normal mode and the low-temperature drive mode. Once the electric vehicle starts travelling, only a torque smaller than the above torque to start is needed to subsequently continue travelling. Therefore, the electric vehicle can continue travelling.

Furthermore, in the battery 110, loss is generated in the internal resistance during the discharge of the current, and hence the temperature Temp of the battery 110 gradually rises. When the temperature Temp of the battery 110 rises, the ion in the battery 110 is activated, finally enabling the continuous extraction of the direct current from a resistance side. Consequently, when the temperature Temp of the battery 110 rises more than or equal to the predetermined value TH, the low-temperature drive mode can switch to the normal mode.

The inverter output currents Iu, Iv and Iw of three phases are three-phase alternating currents flowing through the coils of the motor 130. A period in which the inverter output currents Iu, Iv and Iw are turned on, that is, the inverter 101 is actuated will be called "an on-period", and a period in which the currents are off will be called "an off-period". In other words, "the on-period" is the period in which the direct current that can drive the motor 130 is extracted from the battery 110 by the inverter 101, and "the off-period" is the period in which the power is not extracted from the battery 110 by the inverter 101 and the battery 110 is charged.

Figure 4:
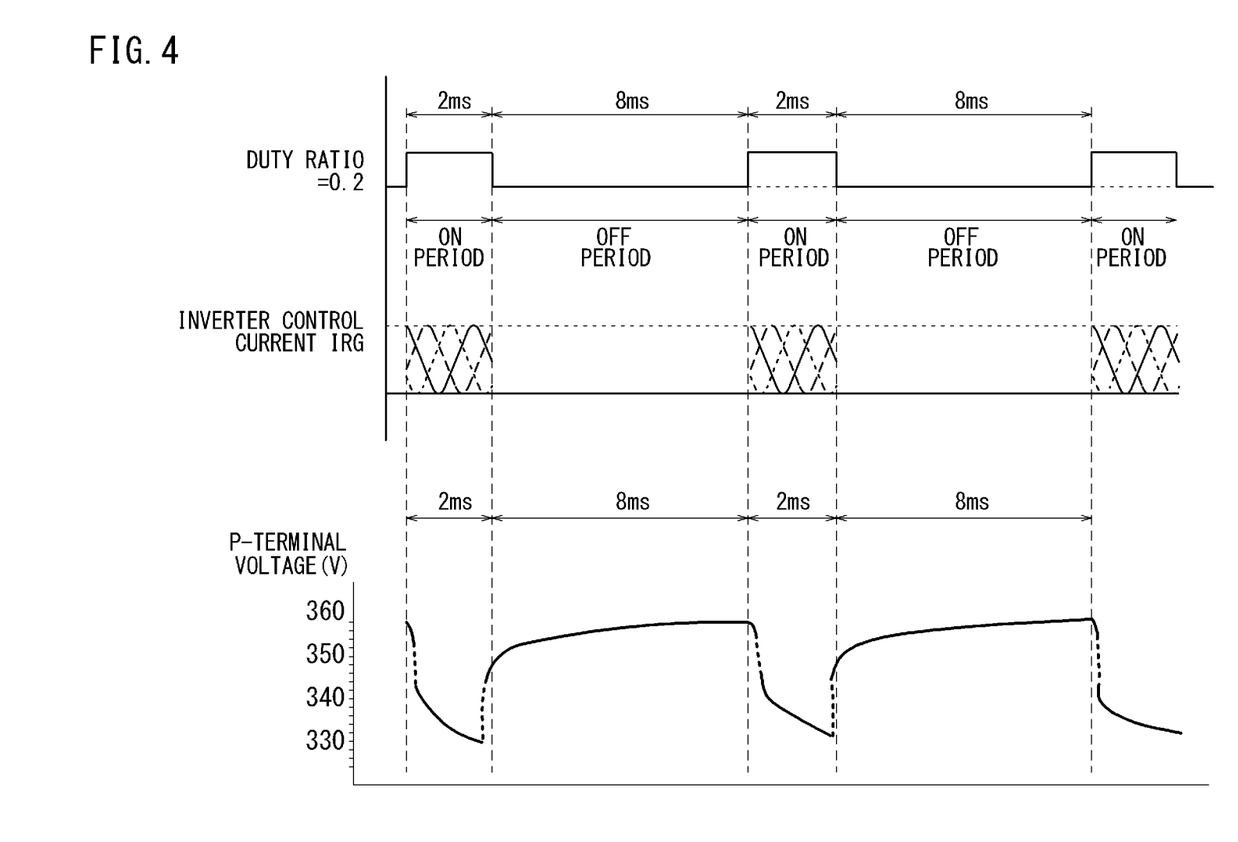
FIG. 4 shows an explanatory view of "an on-period", "an off-period" and "a cycle" of an inverter control current signal of the first embodiment of the present invention.

As shown in FIG. 4, a total time of "the on-period"+"the off-period" is considered as "one cycle". That is, a time required for actuating the inverter 101 for one "the on-period" and then suspending the inverter 101 to the end of "the off-period" is the one cycle. The on-period is determined using, as a standard, a time for which the predetermined power can be continuously supplied at the low temperatures at which activity of the battery 110 decreases. Since the current flowing through the motor 130 is actuated for this period, the loss is generated in the internal resistance of the battery 110 and the temperature gradually rises to activate the battery 110 for duration of "the on-period". On the other hand, since any current does not flow through the motor 130 in "the off-period", the activation of the battery 110 is suspended for that time. Therefore, if it is defined that "the duty ratio"="the on-period"/("the on-period"+"the off-period"="one cycle"), "the duty ratio" indicates a degree of the battery 110 to be activated per unit time in the low-temperature drive mode map 202.

It can be considered from the above definitional equation, when "the cycle" (="the on-period"+"the off-period") is made constant, the larger a value of the duty ratio D indexed in accordance with a value of the current battery temperature Temp is, the higher the degree to activate the battery is. As described above, as the temperature lowers, the ion in the battery 110 is harder to move, and the internal resistance increases. Consequently, there is a limit to the power that can be extracted, and the duty ratio D is limited. In the low-temperature drive mode map 202, therefore, the lower the battery temperature Temp is, the smaller the value of the duty ratio D becomes. That is, during drive at an extremely low temperature such as minus 30° C., the battery starts at the small duty ratio D. However, with elapse of time, an interior of the battery 110 is activated to raise the temperature Temp, and hence the duty ratio D can gradually increase. Finally, the duty ratio D is set to 100%, and the current can be continuously used. That is, so-called "non-pulse like direct current" can be extracted.

As a modification of the first embodiment, the cycle can be changed. If the cycle is changed (lengthened or shortened), an occurrence interval of "the on-period" is changed (shortened or lengthened). Specifically, when the duty ratio D is fixed, the cycle can be set shorter as the battery temperature Temp is lower, and as the battery temperature Temp rises, the cycle can be set longer. Consequently, as the battery temperature Temp rises, "the on-period" can be substantially lengthen. Since a drive current flows through the motor 130 in "the on-period", torque fluctuation occurs. The torque fluctuation may cause a vibration of a car, and hence "the cycle" can be set to 50 ms or less, to reduce the cycle of the torque fluctuation so as to reduce vibration that can be felt by the driver or an occupant.

FIG. 4 explains a battery activation principle by driving the inverter in "the on-period" of the pulse waveforms shown in FIG. 3B of the first embodiment. FIG. 4 shows change in a terminal P voltage of the battery 110 when the motor is driven by the control device 100 of the first embodiment at a lower limit temperature (minus 30° C.) of the battery temperature Temp. In FIG. 4, the voltage of the terminal P acquires 330 volts or more over the cycle, and the voltage is maintained in a range of 340 to 355 volts especially all over "the off-period".

It is known that in a certain experiment, discharge of 1.36 C at 2.25 A/hr is obtained from the battery 110, when the pulse-like direct current is extracted from the lithium ion battery used under environment at minus 30° C. ("Lithium-Ion Battery Pulse/High Rate Demonstration" by Joseph P. Fellner, AFRL-PR-WP-TR-2003-2060, published by U.S. Air Force Laboratory in March 2003). In this report, measured is the current that can be extracted from the battery 110 under the environment at minus 30° C. by use of a static load. That is, it is indicated that even under the environment at minus 30° C., the pulse-like direct current is extracted from the battery 110, to obtain a value (1.36 C) of the current that is large enough to start the rotation of the motor 130 of the electric vehicle.

Figure 5:
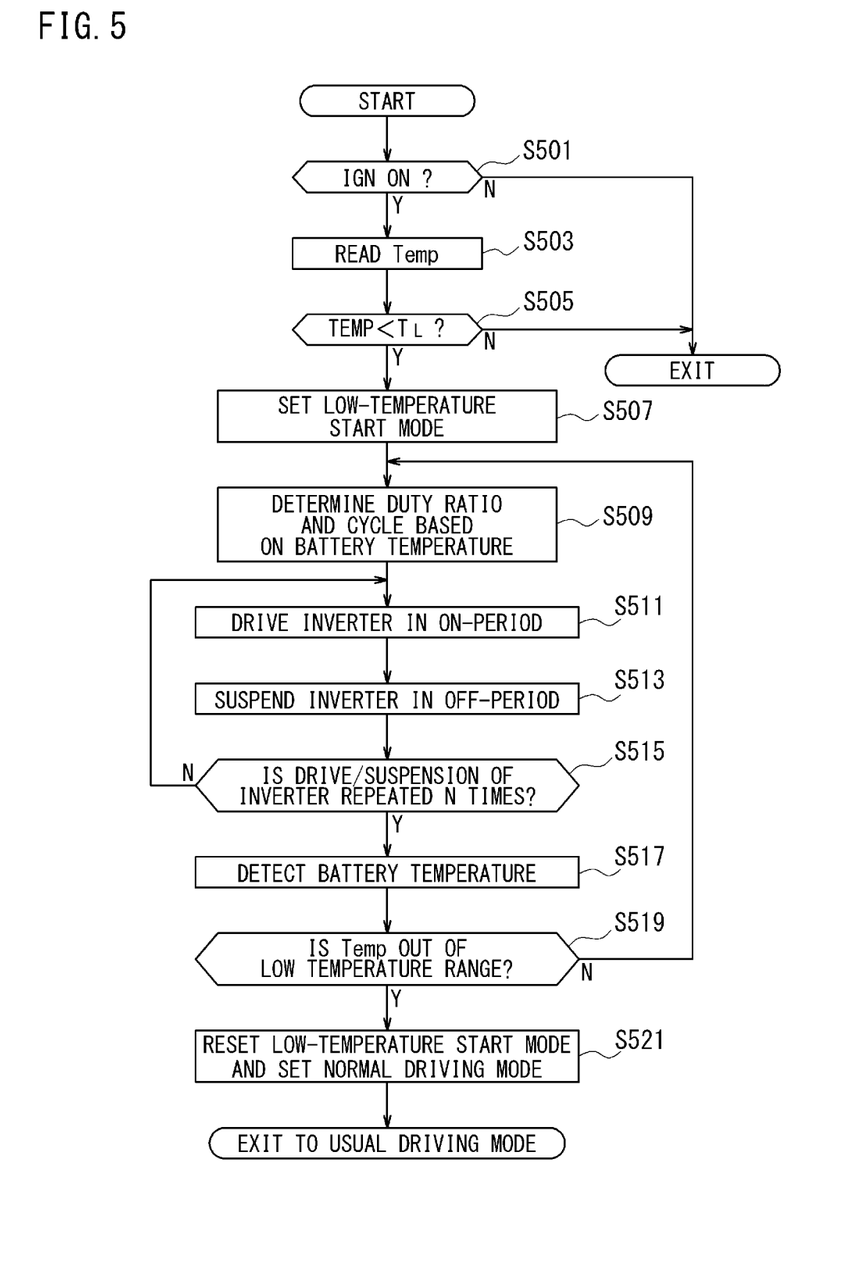
FIG. 5 is a flowchart showing flow of motor control processing of the first embodiment.

FIG. 5 is a flowchart explaining a control procedure to achieve a motor control function of the embodiment. Note that it is evident to achieve this control procedure by an individual circuit of a sequencer or the like, or a microcomputer.

Upon detecting that the driver turns on an ignition key in step S501, the control unit 102 obtains the battery temperature Temp in step S503. In step S505, the mode determining section 203 determines whether the battery temperature Temp is lower than the predetermined value TH (e.g., minus 10° C.). The predetermined value TH can take a different value depending on a type of battery 110 or a use period until now.

In case where it is determined that the battery temperature Temp is lower than the predetermined value TH, that is, a low temperature state is determined, the procedure advances to step S507 to set the control unit 102 to the low-temperature drive mode. In another case, the processing ends, and the motor is driven in the normal mode.

Next, in step S509, the control unit 102 in the low-temperature drive mode determines the cycle and duty ratio D of the pulse-like direct current 111 to be applied to the motor 130 based on the battery temperature Temp. Specifically, as described above, the control unit 102 refers to the low-temperature drive mode map 202 shown in FIG. 2, to obtain the duty ratio D corresponding to the temperature Temp of the battery 110 and the set cycle, and calculates the maximum torque Tm obtained in accordance with the determined cycle and the duty ratio D. The control unit 102 compares the maximum torque Tm with the torque command T* that is obtained from the vehicle control module 140 and is also used in the normal mode. If it is determined that the maximum torque Tm is smaller than the torque command T*, the control unit 102 uses the maximum torque Tm as the torque target value Tt. If it is determined that the maximum torque Tm is larger than the torque command T*, the control unit 102 uses the torque command T* as the torque target value Tt. The drive signal generating section 204 generates an inverter control signal IG for the on-period of 2 ms, to rotate the motor 130.

In steps S511 to S515, as shown in FIG. 3 and FIG. 4, the control unit determines the on-period and the off-period based on the duty ratio D and the cycle that are read from the low-temperature drive mode map 202, drives the motor 130 for the on-period by the inverter 101, and suspends the motor drive for the off-period. For example, as in an example of FIG. 4, the pulse-like direct current can be set to have a cycle of 10 ms including the on-period=2 ms and the off-period=8 ms at minus 30° C. The cycle comprising the drive for the on-period and the suspension for the off-period is repeated N times. An optimal value of N (a number of times) is determined in advance by experiment. Specifically, A number of times is determined such that the battery 110 is not fatigued more than necessary and as suitable for warming the battery 110.

Upon advancing to step S517, the mode determining section 203 detects the battery temperature Temp again, and verifies that steps S511 to S515 have worked correctly. That is, when it is confirmed that the battery temperature Temp is more than or equal to the predetermined value TH (S519), the mode shifts to the normal mode (S521). If the battery temperature Temp is lower than the predetermined value TH and is not out of a low temperature range, the step returns to the step S509. If the battery temperature Temp does not rise after a certain time, an error report may be output.

As described above, the motor control device 100 of the present embodiment comprises:

(1) the inverter 101 that extracts the direct current from the battery 110, generates the phase current, and drives the motor 130, and the control unit 102 that controls the extraction of the direct current from the battery 110 by the inverter 101, based on the temperature Temp of the battery 110.

The control unit 102 controls the inverter 101 to extract the pulse-like direct current 111 from the battery 110, in case where the temperature Temp of the battery 110 is below the predetermined value TH (the predetermined temperature) at which a power that can drive the motor 130 is continuously extractable, by cyclically repeating the on-period to extract the direct current that can drive the motor 130 from the battery 110 and the off-period in which, after the on-period, the power is not extracted from the battery 110 until the direct current that can drive the motor 130 becomes extractable from the battery 110 again. The inverter 101 converts, to the phase current, the direct current extracted from the battery 110 in the on-period.

At the low temperatures of the battery, the lithium ion in the battery 110 is hard to move, and the internal resistance increases, thereby making it difficult to continuously extract the power that is large enough to drive the motor 130. Even at the low temperatures, however, it is possible to temporarily extract the large power from the battery 110. To solve the problem, according to the embodiment, in the low-temperature drive mode, the extraction of the pulse-like direct current is performed, in which the extraction of the direct current that can drive the motor 130 and the suspension of extraction to store electricity again in the capacitor component of the battery 110 are cyclically repeated. Consequently, also at the low temperatures, the rotational driving of the motor 130 can be stably maintained, and thus the embodiment can improve convenience.

(2) The motor control device 100 of the embodiment can be provided in the electric vehicle in which the power to drive the motor 130 is extractable only from the battery 110.

Even in the electric vehicle in which a drive source of the motor 130 is only the battery 110, the rotational driving of the motor 130 can be stably continued until the temperature Temp of the battery 110 reaches the predetermined value TH or more by extracting the pulse-like direct current 111 without another drive source, so that the high convenience is achieved. Note that the embodiment may be applied to a hybrid vehicle in which the battery 110 and an engine are used together as drive sources. Also, in the hybrid vehicle, the pulse-like direct current 111 is extracted at the low temperatures, so that the motor 130 for use together with the engine can be stably rotated.

Furthermore, the battery 110 is discharged in the on-period to generate the loss in the internal resistance, and hence the temperature Temp of the battery 110 gradually rises. Consequently, it is possible to immediately switch from the low-temperature drive mode to the normal mode.

(3) The control unit 102 controls the inverter 101 to extract the pulse-like direct current 111 from the battery 110, in case where the temperature Temp of the battery 110 is below the predetermined value TH, and the control unit controls the inverter 101 to extract the non-pulse like direct current 112 from the battery 110, in case where the temperature Temp of the battery 110 is more than or equal to the predetermined value TH.

The predetermined value TH indicating the temperature at which the power that can drive the motor 130 is continuously extractable is used as a reference, so that when the temperature Temp of the battery 110 rises, the extraction of the pulse-like direct current 111 can immediately shift to the extraction of the non-pulse like direct current 112.

(4) The control unit 102 sets the cycle of the pulse-like direct current 111 between 10 ms and 50 ms inclusive.

Consequently, while stably driving the motor 130, the cycle of the torque fluctuation is reduced so as to reduce vibration that can be felt by the driver or an occupant.

(5) The control unit 102 changes the cycle of the pulse-like direct current 111 in accordance with the temperature Temp of the battery 110.

With the rise of the temperature Temp of the battery 110, an amount of the direct current to be extracted from the battery 110 also increases, and hence the period is changed in accordance with the temperature Temp of the battery 110 so that the temperature Temp of the battery 110 can be efficiently raised.

(6) The control unit 102 lengthens the on-period of the pulse-like direct current 111, as the temperature Temp of the battery 110 rises.

The on-period is lengthened as the temperature Temp of the battery 110 rises so that the temperature Temp of the battery 110 can be efficiently raised.

(7) The control unit 102 shortens the off-period of the pulse-like direct current 111, as the temperature Temp of the battery 110 rises.

The off-period is shortened as the temperature Temp of the battery 110 rises, so that the extraction of the pulse-like direct current 111 can smoothly shift to the extraction of the non-pulse like direct current 112.

Another Embodiment

As above, the invention of the present application has been described with reference to the embodiment, but the present invention is not limited to the above embodiment. In a configuration and details of the present invention, there can be made various changes that can be understood by a person skilled in the art in a scope of the present invention. Furthermore, a system, a method or a device obtained by combining separate characteristics included in respective embodiments in any manner is also included in the scope of the present invention.

Additionally, the present invention may be applied to a system constituted of a plurality of apparatuses, or a single-unit device. Furthermore, the present invention is also applicable to a case where an information processing program that achieves a function of the embodiment is directly or remotely supplied to the system or the device. Therefore, the scope of the present invention also includes the program to be installed in a computer to achieve the function of the present invention by the computer, a medium that stores the program, and a worldwide web (WWW) server to download the program. In particular, the scope of the present invention includes at least a non-transitory computer readable medium storing a program that causes the computer to execute the processing steps included in the above described embodiment.

REFERENCE SIGNS LIST 100 motor control device
101 inverter
102 control unit
110 battery
120 battery management system
130 motor
140 vehicle control module
150 sensor
201 travelling map
202 low-temperature drive mode map
203 mode determining section

What is claimed is:

1. A control device of a motor driven vehicle, comprising:
an inverter that extracts a direct current from a battery of a vehicle configured to travel by rotational driving of a motor, generates a phase current, and drives the motor,
a vehicle control module that generates a torque command signal to drive the motor in accordance with a driver's operation, and
a control unit that controls an extraction of the direct current from the battery by the inverter, based on a temperature of the battery, wherein
the vehicle control module sends the torque command signal to the control unit,
the control unit controls the inverter to extract a pulse-like direct current from the battery, in case where the temperature of the battery is below a predetermined temperature at which a motor drivable power is continuously extractable,
the control unit controls the inverter in the extraction of the pulse-like direct current to cyclically repeat an on-period to extract the motor drivable direct current from the battery and an off-period in which, after the on-period, the power is not extracted from the battery until the motor drivable direct current becomes extractable from the battery again, and the control unit calculates a maximum torque that the motor is capable of outputting in case where the pulse-like direct current is extracted from the battery, compares the maximum torque with the torque command signal, sets a smaller one of the maximum torque and the torque command signal as a torque target value to drive the motor, and controls the extraction of the pulse-like direct current by the inverter to drive the motor at the torque target value, and
the inverter converts, to the phase current, the pulse-like direct current extracted from the battery in the on-period.

2. An electric vehicle comprising the control device of the motor driven vehicle according to claim 1, wherein the power to drive the motor is extractable only from the battery.

3. The control device of the motor driven vehicle according to claim 1, wherein the control unit controls the inverter to extract the pulse-like direct current from the battery, in case where the temperature of the battery is below the predetermined temperature, and the control unit controls the inverter to extract a non-pulse like direct current from the battery, in case where the temperature of the battery is more than or equal to the predetermined temperature.

4. The control device of the motor driven vehicle according to claim 1, wherein the control unit sets a cycle of the pulse-like direct current between 10 ms and 50 ms inclusive.

5. The control device of the motor driven vehicle according to claim 1, wherein the control unit changes a cycle of the pulse-like direct current in accordance with the temperature of the battery.

6. The control device of the motor driven vehicle according to claim 5, wherein the control unit lengthens the on-period of the pulse-like direct current, as the temperature of the battery rises.

7. The control device of the motor driven vehicle according to claim 5, wherein the control unit shortens the off-period of the pulse-like direct current, as the temperature of the battery rises.

8. The control device of the motor driven vehicle according to claim 6, wherein the control unit shortens the off-period of the pulse-like direct current, as the temperature of the battery rises.

9. A control method of a motor driven vehicle comprising:
a step of generating a torque command signal to drive a motor in accordance with a driver's operation of the vehicle configured to travel by rotational driving of the motor,
a step of detecting a temperature of a battery of the vehicle, and
a step of controlling an inverter to extract a pulse-like direct current from the battery, in case where the temperature of the battery is below a predetermined temperature at which a motor drivable power is continuously extractable,
the step of controlling the inverter to extract the pulse-like direct current from the battery including: controlling the inverter to cyclically repeat an on-period to extract the motor drivable direct current from the battery and an off-period in which, after the on-period, the power is not extracted from the battery until the motor drivable direct current becomes extractable from the battery again, calculating a maximum torque that the motor is capable of outputting in case where the pulse-like direct current is extracted from the battery, comparing the maximum torque with the torque command signal, setting a smaller one of the maximum torque and the torque command signal as a torque target value to drive the motor, and controlling an extraction of the pulse-like direct current by the inverter to drive the motor at the torque target value, and
further comprising a step of, by the inverter, converting, to a phase current, the pulse-like direct current extracted from the battery in the on-period, and driving the motor.

10. A non-transitory computer readable storage medium storing a control program of a motor driven vehicle that causes a computer to execute:
- a step of generating a torque command signal to drive a motor in accordance with a driver's operation of the vehicle configured to travel by rotational driving of the motor,
- a step of detecting a temperature of a battery of the vehicle, and
- a step of controlling an inverter to extract a pulse-like direct current from the battery, in case where the temperature of the battery is below a predetermined temperature at which a motor drivable power is continuously extractable,
- the step of controlling the inverter to extract the pulse-like direct current from the battery including: controlling the inverter to cyclically repeat an on-period to extract the motor drivable direct current from the battery and an off-period in which, after the on-period, the power is not extracted from the battery until the motor drivable direct current becomes extractable from the battery again, calculating a maximum torque that the motor is capable of outputting in case where the pulse-like direct current is extracted from the battery, comparing the maximum torque with the torque command signal, setting a smaller one of the maximum torque and the torque command signal as a torque target value to drive the motor, and controlling an extraction of the pulse-like direct current by the inverter is controlled to drive the motor at the torque target value, and
- further causes the computer to execute a step of, by the inverter, converting, to a phase current, the pulse-like direct current extracted from the battery in the on-period, and driving the motor.

* * * * *